United States Patent [19]

Dearth

[11] 4,399,866

[45] Aug. 23, 1983

[54] METHOD FOR CONTROLLING THE FLOW OF SUBTERRANEAN WATER INTO A SELECTED ZONE IN A PERMEABLE SUBTERRANEAN CARBONACEOUS DEPOSIT

[75] Inventor: James D. Dearth, Dallas, Tex.

[73] Assignee: Atlantic Richfield Company, Los Angeles, Calif.

[21] Appl. No.: 253,114

[22] Filed: Apr. 10, 1981

[51] Int. Cl.³ .................. E21B 33/138; E21B 43/247; E21B 43/30

[52] U.S. Cl. .................................... 166/245; 166/259; 166/261; 166/285; 166/292; 166/294

[58] Field of Search ............... 166/245, 258, 261, 285, 166/292, 294, 295, 305 D; 405/263, 264, 270; 48/DIG. 6

[56] References Cited

U.S. PATENT DOCUMENTS

| | | | |
|---|---|---|---|
| 1,198,078 | 9/1916 | Squires | 166/245 X |
| 2,777,679 | 1/1957 | Ljungstrom | 166/302 |
| 2,818,240 | 12/1957 | Livingston | 299/4 |
| 2,842,205 | 7/1958 | Allen et al. | 166/285 |
| 3,094,846 | 6/1963 | Peeler, Jr. | 405/263 X |
| 3,300,984 | 1/1967 | Armentrout | 405/263 |
| 3,302,707 | 2/1967 | Slusser et al. | 166/245 |
| 3,318,380 | 5/1967 | Tenny | 166/245 |
| 4,009,578 | 3/1977 | Choi | 405/263 |
| 4,018,286 | 4/1977 | Gall et al. | 166/295 |
| 4,305,463 | 12/1981 | Zakiewicz | 166/245 |

Primary Examiner—Stephen J. Novosad
Assistant Examiner—George A. Suchfield
Attorney, Agent, or Firm—F. Lindsey Scott

[57] ABSTRACT

A method for controlling the flow of subterranean water into a selected zone in a permeable subterranean carbonaceous deposit by injecting an aqueous plugging material into the permeable deposit through a plurality of wells to produce a plurality of injected areas of a size such that the injected areas overlap to form a barrier to the flow of subterranean water into the selected zone.

5 Claims, 4 Drawing Figures

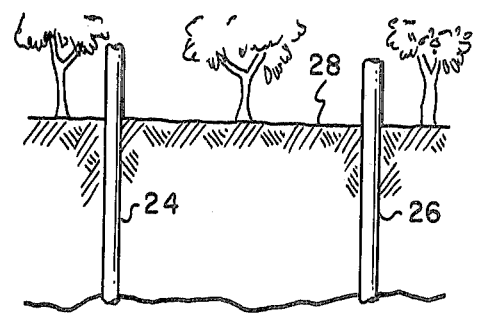
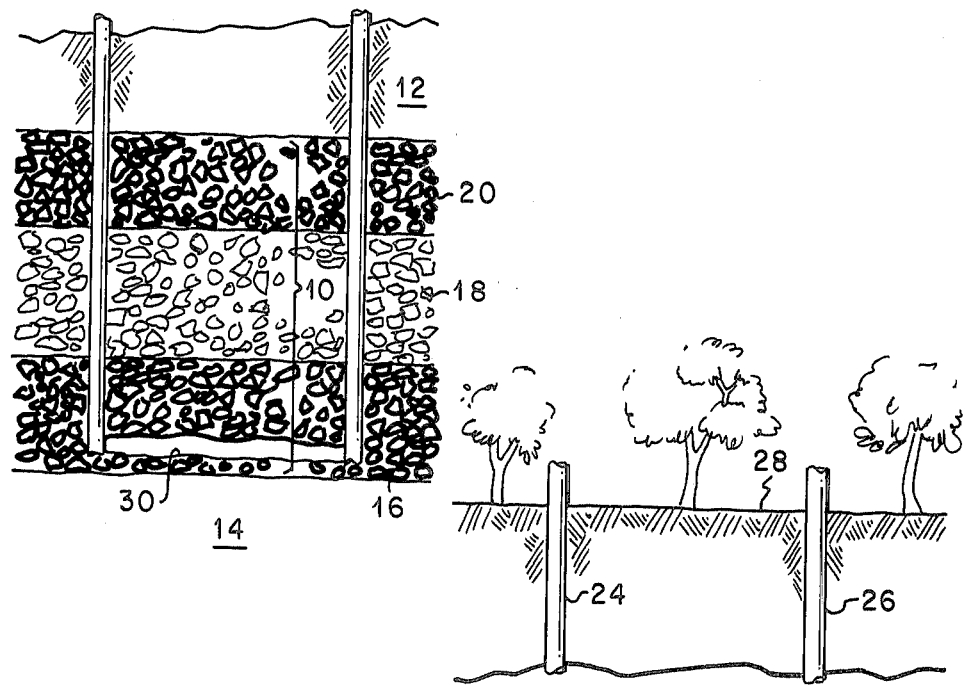
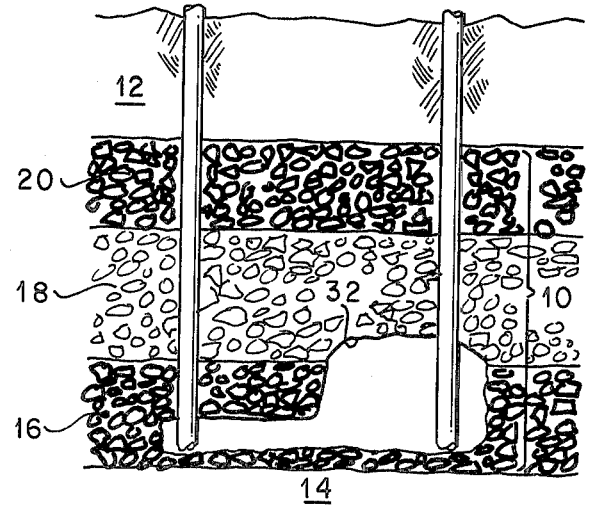

METHOD FOR CONTROLLING THE FLOW OF SUBTERRANEAN WATER INTO A SELECTED ZONE IN A PERMEABLE SUBTERRANEAN CARBONACEOUS DEPOSIT

This invention relates to methods for controlling the flow of subterranean water into selected zones in subterranean carbonaceous formations.

This invention further relates to methods for controlling the flow of subterranean water into selected zones in the practice of processes for the recovery of heat values from subterranean carbonaceous deposits such as oil shale deposits, petroliferous formations and coal deposits.

In many instances carbonaceous deposits such as oil shale, coal of various grades, and petroliferous deposits are subject to flooding by subterranean water during the practice of processes for the recovery of heating values from such deposits. In the production of petroleum some water invasion can normally be tolerated since the materials are readily separated. However, in instances where combustion or partial combustion processes are used for the recovery of heating values from deposits such as oil shale and coal the invasion of uncontrolled amounts of subterranean water adversely affects the practice of the process. In other words, the presence of excessive quantities of water renders the burning or partial oxidation of such deposits impossible or at the best impractical and may result in the production of increased quantities of water at the surface, with a resulting increased water clean-up requirement and the like.

In the use of underground coal gasification processes to produce low or medium BTU gas, it has been found necessary to use pressures in excess of the hydrostatic pressure of the formation in some instances to prevent the influx of water and the like. For a variety of reasons it is desirable to have more latitude in the operating pressure used in the practice of such processes than is possible when it is necessary to maintain such elevated pressures for the control of water. Further, the use of such pressures in many instances results in the loss of gaseous products to the producing formation. Accordingly, a continuing effort has been directed to the development of methods for controlling the flow of subterranean water into selected zones in permeable subterranean carbonaceous deposits.

It has now been found that the flow of water into a selected zone in a permeable subterranean carbonaceous deposit is readily controlled by a method consisting essentially of: (a) positioning a plurality of wells about the selected zone and in fluid communication with the permeable deposit; (b) injecting an aqueous plugging material into at least a portion of the wells in an amount sufficient to fill at least a major portion of the permeable space in the permeable deposit about each injected well and radially outwardly from each injected well for a distance sufficient to form an injected area of a size such that the injected areas so formed by the injection of the aqueous plugging material into the wells overlap to form a barrier to the flow of subterranean water into the selected zone; and (c) maintaining the aqueous plugging material in position in the formation until the material has plugged the formation sufficiently to inhibit the flow of water through the injected areas.

Some suitable plugging materials are sodium silicate, furfuryl alcohol resins, urea-formaldehyde resins, chrome-lignosulfate, acrylamide/N,N'-methylenebisacrylamide, latex polymers, bentonite, oil-in-water slurries, suspensions of finely divided inorganic solids such as calcium carbonate, silica, alumina and the like in an aqueous solution containing a suitable suspending agent such as hydroxyethylcellulose and the like.

FIG. 1 is a cross-sectional view of a coal deposit penetrated by two wells for use in the in situ gasification of the coal deposit;

FIG. 2 is a cross-sectional view of the same subterranean formation after in situ gasification of the coal deposit has been initiated;

In the discussion of the figures the same numbers will be used to refer to the same or similar components throughout.

Figure 3:
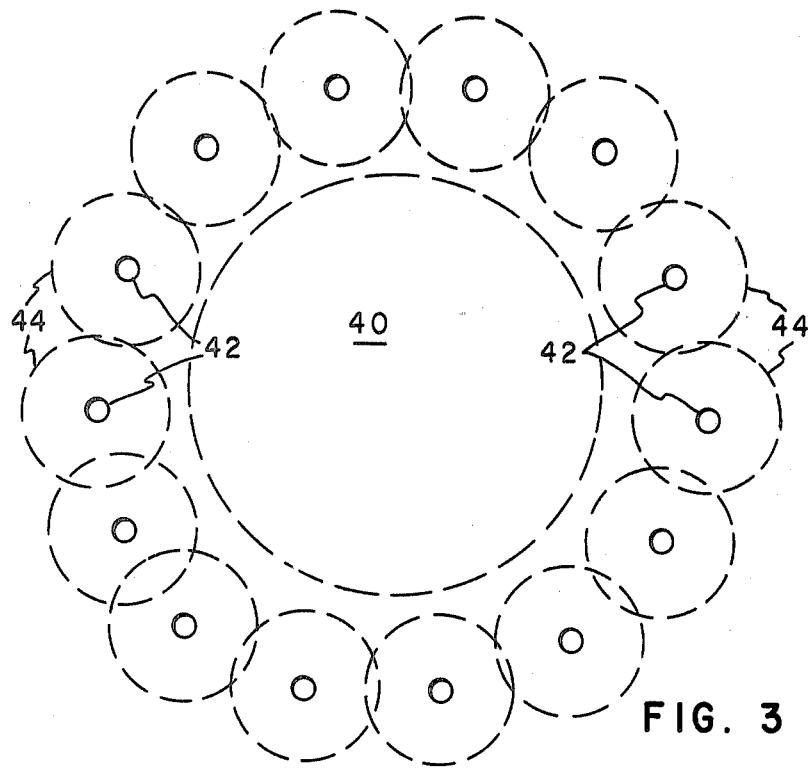
FIG. 3 is a top view of a well spacing and an injected zone spacing suitable for use in the practice of the present invention; and, FIG. 4 is a top view of an alternate well and injected zone spacing.

In FIG. 1, a coal deposit 10 consisting of a bottom zone 16, a middle zone 18 and an upper zone 20 is shown positioned beneath an overburden 12. An underlying formation 14 underlies coal deposit 10. Coal deposit 10 is penetrated by a first well bore 24 and a second wellbore 26 positioned for the in situ gasification of coal deposit 10. Wellbores 24 and 26 are adapted to the injection of a free oxygen-containing gas from the surface 28 through second wellbore 26 with product gases being recovered through first wellbore 24. In FIG. 1 a link or gas passageway 30 is shown between the bottom of first well 24 and second well 26. Such a passageway may be established by a variety of means known to those skilled in the art such as fracturing, horizontal drilling, reverse combustion linking, or the like. Such techniques are considered to be well known to those skilled in the art and will not be discussed in great detail. In reverse combustion linking, air injection may be commenced through second well 26 and continued until a suitable air flow is detected in first well 24 with ignition thereupon being accomplished in first wellbore 24 with combustion then proceeding in a reverse direction to the gas flow back to second wellbore 26. As indicated previously, the methods for establishing a combustion zone between wells are considered to be known to the art and will not be discussed further. After the initial passageway 30 has been established, in situ combustion continues in a manner well known to those skilled in the art with partial combustion of the coal deposit occurring to produce a gaseous mixture which contains substantial quantities of combustible materials such as hydrogen, carbon monoxide, low molecular weight hydrocarbons, tars, and the like which is usable as a low or medium BTU fuel or which is suitable for upgrading to produce methanol, methane, or the like as known to those skilled in the art.

Many coal deposits which are not suitable for surface mining because of the depth of the deposit or the like may be well suited to in situ coal gasification. Such deep coal deposits frequently contain substantial quantities of water or even where substantial quantities of water are not present the formations may be in fluid communication with nearby formations which contain substantial quantities of water. As shown in FIGS. 1 and 2 middle zone 18 is a relatively permeable zone in coal deposit 10. While a middle permeable zone is shown for purposes of the present discussion, it is recognized that the entire coal deposit may be permeable or permeable zones may be interspersed with less permeable zones and the like. In any event, the presence of such permeable zones presents substantial difficulties when subterranean water is present in the area in quantities sufficient to impede the gasification of the coal deposit. In such instances it is necessary that the flow of subterranean water into the in situ gasification zone be eliminated or controlled. As indicated previously, such control has been accomplished in the past by operating at pressures greater than hydrostatic for the formation, pumping to remove water adjacent the zone of interest and the like. For a variety of reasons, such techniques have not been completely successful in all instances and it has now been found that the flow of subterranean water into the zone of interest is readily controlled by positioning a plurality of injection wells from the surface to the permeable zone or zones around the zone of interest and thereafter injecting an aqueous plugging material into the subterranean formation in an amount sufficient to fill at least a major portion of the permeable space in the permeable deposit about each well and radially outwardly from each well for a distance sufficient to form an injected area of a size such that the injected areas overlap to form a barrier to the flow of subterranean water into the selected zone. The positioning of the injection wells can vary widely dependent upon the permeability of the formation, the flow patterns of the injected material in the formation and the like. Typically, geometric shapes such as squares, polygons, circles and the like define the zone of interest although substantially any shape zone may be used. In many instances square zones or rectangular zones are gasified.

In FIG. 3 a circular zone of interest 40 is shown with a plurality of injection wells 42 and a plurality of overlapping injected zones 44 being positioned around zone 40. Injection wells 42 and injected zones 44 are positioned about the entire perimeter of zone 40 to prevent the flow of subterranean water into zone 40. By positioning injection wells 42 and injected zones 44 to prevent the influx of water into zone 40 as shown in FIG. 3 the gasification process can be operated at reduced pressures. In many instances it is desirable to operate the process at a lower pressure so that product gases are not lost to the surrounding formation, to achieve various thermodynamic benefits and the like.

In the gasification of subterranean coal deposits a variety of simultaneous reactions may occur including but not limited to the following:

(1) $2C + O_2 = 2CO$ (2) $C + O_2 \rightarrow CO_2$ (3) $C + CO_2 \rightarrow 2CO$ (4) $C + H_2O \rightarrow CO + H_2$ (5) $CO + 3H_2 \rightarrow CH_4 + H_2O$ While these equations may or may not all occur in any given in situ gasification process, they are typical of a variety of reactions occurring in the partial combustion of the carbonaceous deposit to produce low or medium BTU gas. While applicant does not wish to be bound by any particular theory, the primary reactions are believed to be shown in equations 1, 2, and 4.

Figure 4:
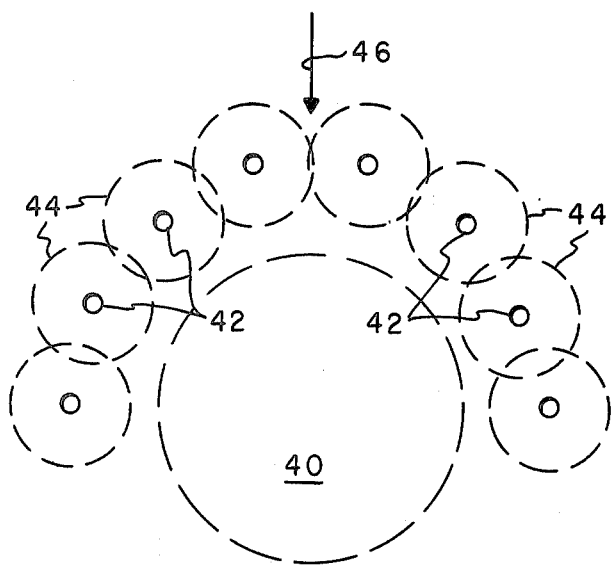

As shown in FIG. 4 injected zones 44 may not extend about the entire perimeter of zone 40 but rather about only the portion of zone 40 necessary to prevent the flow of water into zone 40. For instance, with a sloping formation it may be possible to form a water barrier upstream from zone 40 as shown in FIG. 4. With water flow from a direction as indicated by arrow 46 a barrier may be sufficient to divert water around zone 40.

In the instances where injected zones 44 do not overlap completely about the perimeter of zone 40 as shown in FIG. 4, it is difficult to control the escape of gas from the zone of interest even though the water flow may be controlled. When the zone of interest is completely surrounded by injected areas 44 as shown in FIG. 3 it is possible to control the escape of gases from zone 40.

The problem resulting from the uncontrolled influx of water into the zone of interest is demonstrated in FIG. 2. Upon burning into permeable seam 18, as shown, water can rapidly and freely enter the combustion zone 32 and potentially extinguish the burning zone, or lower the temperatures in zone 32 sufficiently to inhibit the formation of combustibles in the product gas.

In the practice of the method of the present invention it is desirable that the injection of the aqueous plugging material be accomplished in all injection wells 42 at substantially the same time at substantially the same flow rates. Such is conducive to forming consistently overlapping injection zones 44 in the subterranean deposit. Further, it is desirable that simultaneously with the injection of the aqueous plugging material into the subterranean deposit a fluid such as water, gas or the like be injected into zone 40 to prevent the flow of the aqueous plugging material into zone 40 during the formation of injected areas 44. The injection of a fluid such as water into zone 40 during the injection of the plugging material provides a convenient check on the effectiveness of the overlapping of injected areas 44. When overlapping injected areas 44 are complete about zone 40 an increase in the pressure required to inject water into zone 40 should be apparent. Plugging material injection and water injection into zone 40 may be stopped when overlapping injected areas 44 are filled with plugging material as indicated by an increase in the pressure required to inject the aqueous fluid.

Suitable materials for use as the aqueous plugging material are sodium silicate, furfuryl alcohol resins, urea-formaldehyde resins, chrome-lignosulfonates, acrylamide/N,N'-methylenebisacrylamide, latex polymers, bentonite oil-in-water slurries, suspensions of finely divided inorganic solids such as calcium carbonate, silica, alumina, and the like in aqueous solutions containing a suitable suspendant such as hydroxyethylcellulose, and the like. The particular plugging material selected is not considered to be a novel aspect of the present invention since a large number of suitable plugging materials for plugging water wet formations are known to the art. Such materials may be polymeric, polymer precursors, suspensions of finely divided inorganic particulate materials which plug the formation, etc.

Plugging materials such as sodium silicate, furfuryl alcohol resins, urea-formaldehyde resins, chrome-lignosulfonates and acrylamide/N,N'-methylenebisacrylamide tend to plug by gelling in the formation. Such materials normally are suitably fluid to permit injection into small pores in the formation.

Organic gelling materials are less temperature resistant than inorganic plugging materials. Generally, the use of organic gelling materials is preferred especially where temperatures in the formation are less than about 250° F.

Suspensions of finely divided inorganic materials such as bentonite oil-in-water suspensions, suspensions of finely divided inorganic solids such as calcium carbonate, silica, alumina and the like in aqueous solutions containing a suitable suspendant such as hydroxyethylcellulose or the like are also suitable as plugging materials, but normally are not as fluid as the gelling materials. Such materials tend to plug by depositing the inorganic solids in the pores, etc., of the formation with the fluid, i.e., water subsequently draining away, etc. Such materials are more temperature resistant than the organic gelling materials and can be used at temperatures in excess of 250° F.

Of the plugging materials discussed, sodium silicate is preferred.

Aqueous solutions are preferred for the injection of the plugging materials since the formations with which the method of the present invention is useful are normally "water wet" so that aqueous solutions are more effective for the injection of the plugging materials than non-aqueous solutions.

In the practice of the method of the present invention while it is desirable to control the flow of subterranean water into zone 40, it is not essential that the flow of subterranean water into zone 40 be stopped completely since in many instances the presence of small amounts of water is desirable. Such process control may be accomplished by adjustment of the operating pressure in zone 40 thereby controlling the amount of water which leaks past injected zones 44 into zone 40.

While the invention has been discussed above with reference to a coal deposit it is pointed out that a similar technique could be used in thermal recovery processes in petroleum formations, in the recovery of shale oil by in situ combustion techniques, and the like although the method of the present invention is considered to be particularly well suited to the recovery of heating values from subterranean coal deposits by in situ gasification processes. The gel-forming materials should be maintained in position in injected zones 44 for a suitable period of time to permit the material to gel to a consistency such that it effectively controls the flow of water through injected zones 44. In some instances it may also be necessary to maintain the suspension of inorganic solids in position in injected zones 44 for a suitable period of time to permit the solids to settle, etc. The time required will vary substantially depending upon the particular plugging material chosen, the concentration of the material in the aqueous solution, the presence of gelling catalysts in the aqueous solution and the like as well known to those skilled in the art. Such gelling catalysts may be pre-injected or injected with the aqueous solution of gel-forming materials and the like. Typically the aqueous solution of plugging material can be maintained in position for a sufficient period of time by merely stopping the injection of the plugging material into injection wells 42 and stopping the injection of water into zone 40 for a period of time sufficient to permit the material to plug the formation in injected zones 44.

Having thus described the present invention by reference to its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art upon a review of the foregoing disclosure of preferred embodiments.

Having thus described the invention, I claim:

1. A method for controlling the flow of subterranean water into a selected zone in a permeable subterranean coal deposit, said method consisting essentially of:
    (a) positioning a plurality of wells about said selected zone and in fluid communication with said permeable deposit;
    (b) injecting an aqueous plugging material into at least all of said wells simultaneously at substantially the same rate in an amount sufficient to fill at least a major portion of the permeable space in said permeable deposit about each injected well and radially outwardly from each injected well for a distance sufficient to form injected areas of a size such that the injected areas so formed by the injection of such aqueous plugging material overlap to form a barrier about substantially the total perimeter of said selected zone to prevent the flow of subterranean water into said selected zone; and
    (c) injecting water into said permeable deposit in said selected zone during the injection of said aqueous plugging material into said wells to limit the entry of said aqueous plugging material into said selected zone during the injection of said plugging material;
    (d) maintaining said aqueous plugging material in position in said formation until said material has plugged the formation sufficiently to inhibit the flow of water through said injected areas.

2. The method of claim 1 wherein said plugging material is at least one aqueous gel-forming polymer selected from the group consisting of sodium silicate, furfuryl alcohol resins, urea-formaldehyde resins, chrome-lignosulfonates and acrylamide/N,N'-methylenebisacrylamide.

3. The method of claim 1 wherein said plugging material is a suspension of a finely-divided inorganic solid in an aqueous solution containing a suitable suspendant.

4. The method of claim 3 wherein said plugging material is selected from the group consisting of bentonite oil-in-water suspensions, and suspensions of calcium carbonate, silica or alumina in water containing hydroxyethylcellulose.

5. The method of claim 1 wherein said plugging material injection and said water injection into said selected zone are stopped when said overlapping injected areas are filled with said plugging material as indicated by an increase in the pressure required to inject said aqueous fluid.

* * * * *